(12) United States Patent
Hu et al.

(10) Patent No.: US 7,504,453 B2
(45) Date of Patent: Mar. 17, 2009

(54) COMPOSITE THERMAL INTERFACE MATERIAL INCLUDING PARTICLES AND NANOFIBERS

(75) Inventors: Xuejiao Hu, Stanford, CA (US); Linan Jiang, Tucson, AZ (US); Kenneth E. Goodson, Belmont, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 693 days.

(21) Appl. No.: 11/015,218

(22) Filed: Dec. 17, 2004

(65) Prior Publication Data

US 2005/0171269 A1    Aug. 4, 2005

Related U.S. Application Data

(60) Provisional application No. 60/541,428, filed on Feb. 2, 2004.

(51) Int. Cl.
  *C08K 3/04* (2006.01)
(52) U.S. Cl. .................... 524/495; 977/773; 977/776; 977/813
(58) Field of Classification Search ................ 524/495; 977/773, 776, 813
See application file for complete search history.

(56) References Cited

U.S. PATENT DOCUMENTS

| 6,119,573 | A | 9/2000 | Berens et al. ............. 89/1.816 |
|---|---|---|---|
| 6,311,769 | B1 | 11/2001 | Bonneville et al. .......... 165/185 |
| 6,407,922 | B1 | 6/2002 | Eckblad et al. ............. 361/704 |
| 6,713,519 | B2 * | 3/2004 | Wang et al. ................. 518/715 |
| 6,749,827 | B2 * | 6/2004 | Smalley et al. ........... 423/447.3 |
| 2002/0100578 | A1 | 8/2002 | Withers et al. ............. 165/80.4 |
| 2004/0194944 | A1 | 10/2004 | Hendricks et al. .......... 165/181 |
| 2004/0209782 | A1 | 10/2004 | Zhang et al. ................ 508/113 |
| 2005/0092205 | A1 * | 5/2005 | Li et al. .................... 106/31.92 |

* cited by examiner

*Primary Examiner*—Robert D. Harlan
(74) *Attorney, Agent, or Firm*—Lumen Patent Firm

(57) ABSTRACT

A thermal interface material (TIM) including a mechanically compliant matrix material which contains thermally conductive particles and thermally conductive nanofibers is provided. Such a TIM provides enhanced thermal conductivity without excessive viscosity when the nanofiber volume concentration is above a threshold value for enhanced thermal conductivity.

17 Claims, 4 Drawing Sheets

COMPOSITE THERMAL INTERFACE MATERIAL INCLUDING PARTICLES AND NANOFIBERS

CROSS REFERENCE TO RELATED APPLICATIONS

This application claims the benefit of U.S. provisional application 60/541,428, filed on Feb. 2, 2004, entitled "Composite Thermal Interface Material Including Particles and Nanofibers", and hereby incorporated by reference in its entirety.

FIELD OF THE INVENTION

The present invention relates to thermal interface materials used to promote heat flow from a heat source to its cooling components.

BACKGROUND

It is often necessary or desirable to provide for heat flow away from a heat source (e.g., an active device). Provision of a heat sink (sometimes also including a heat spreader) in thermal communication with the heat source is a typical method for cooling the heat source. There are many ways to provide thermal communication between heat source and heat sink. For example, the heat source and the heat sink can be in mechanical contact. Although making mechanical contact between source and sink is a simple method for providing thermal communication, it has severe practical disadvantages. In particular, the thermal resistance between source and sink can vary dramatically depending on the detailed properties of the surfaces making contact. Furthermore, it can be undesirably expensive to provide good thermal contact surfaces (i.e., clean, flat and smooth) on source and sink.

Accordingly, a commonly employed approach for providing thermal communication between heat source and heat sink is to position the source and sink in proximity, and fill the space between them with a thermal interface material (TIM). The TIM is typically a relatively viscous liquid or a flexible solid (i.e., it is mechanically compliant). A compliant TIM greatly reduces the flatness and smoothness requirements on the source and sink thermal contact surfaces, since the compliant TIM can flow or deform to make contact with irregular surfaces. Mechanically compliant TIMs are also highly useful to prevent formation of voids due to thermal cycling combined with thermal expansion mismatch. In addition to mechanical compliance, another desirable characteristic of a TIM is high thermal conductivity.

Various approaches for improving TIM thermal conductivity have been considered in the art. Several thermal interface materials are known which have inclusions in a matrix material, where the inclusions have higher thermal conductivity than the matrix material. For example, U.S. Pat. No. 6,311,769 considers a TIM having graphitized fiber inclusions arranged to protrude from the surface of the TIM. Such arrangement of fibers may not be easy to provide in practice, so approaches which require no special alignment of the inclusions are preferable. Another example is U.S. 2004/0209782, which considers carbon nanotube or carbon nanoparticle inclusions in a TIM. Carbon nanotubes and/or nanoparticles have also been considered for use in heat spreaders (e.g., as in U.S. Pat. No. 6,407,922). A heat spreader is typically a rigid solid structure for facilitating the lateral flow of heat (e.g., to reduce peak temperature at hot spots). Thus a heat spreader can be used in conjunction with a TIM, but is not itself a TIM. The function of a TIM is to facilitate the flow of heat across an interface separating source from sink (i.e., longitudinal heat flow as opposed to lateral heat flow), and this function is different than the function of a heat spreader. Carbon nanotubes (e.g., as in the preceding two examples) are promising materials for inclusion in TIMs, since their thermal conductivity is relatively large. However, this promise has not been completely realized thus far. One reason for this is that adding high concentrations of carbon nanotubes to a TIM frequently increases the TIM viscosity to undesirably high levels.

Accordingly, it would be an advance in the art to provide a thermal interface material having high thermal conductivity, relatively low nanofiber concentration and a relatively low viscosity.

SUMMARY

The present invention provides a thermal interface material (TIM) including a mechanically compliant matrix material which contains thermally conductive particles and thermally conductive nanofibers. Such a TIM provides enhanced thermal conductivity without excessive viscosity when the nanofiber volume concentration is above a threshold value for enhanced thermal conductivity. In one embodiment of the invention, the matrix material is silicone oil, the particles are nickel spheres, and the nanofibers are carbon nanotubes. In another embodiment of the invention, the matrix material is silicone oil, the particles are ZnO particles, and the nanofibers are carbon nanotubes.

DETAILED DESCRIPTION

Figure 1:
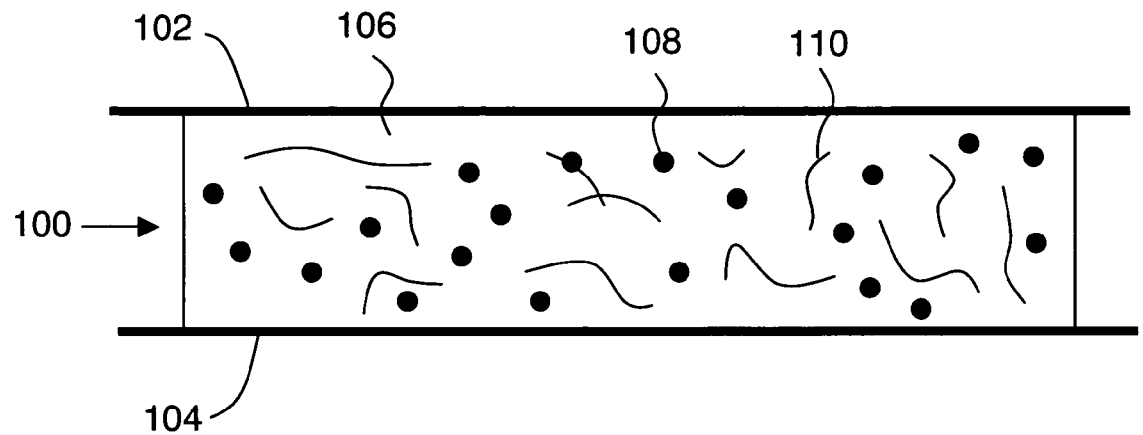
FIG. 1 shows a thermal interface material according to an embodiment of the invention.

FIG. 1 shows a thermal interface material (TIM) 100 according to an embodiment of the invention. TIM 100 is disposed between surface 102 of a heat source and surface 104 of a heat sink. TIM 100 includes a mechanically compliant matrix material 106, which can be silicone oil or any other suitable material, including but not limited to, epoxy, elastomer or phase change materials. Matrix material 106 is mechanically compliant in order to provide good thermal contact to surfaces 102 and 104. Thus, the dynamic viscosity of matrix material 106 is preferably 1,000-100,000 cgs. The preferred viscosity can depend on the attachment pressure applied to the TIM. Mechanical compliance of TIM 100 is preferably provided at a working temperature (or temperature range) of the TIM (e.g., 45 C to 85 C). Some TIM materials (e.g., phase change materials) are solid at room temperature and liquid at working temperature.

A plurality of thermally conductive particles 108 are disposed within matrix material 106. Similarly, a plurality of thermally conductive nanofibers 110 are disposed within matrix material 106. The volume concentrations of particles 108 and fibers 110 in TIM 100 are Np and Nf respectively. More specifically, Np is the fraction of the total volume of TIM 100 occupied by particles 108 and Nf is the fraction of the total volume of TIM 100 occupied by nanofibers 110. Typically, the distribution of particles 108 and fibers 110 within matrix material 106 is random, as would be provided by thorough mixing of TIM 100, although such a random distribution is not required to practice the invention. Mixing can be performed mechanically and/or with the use of ultrasound. Thermally conductive particles 108 can be metal spheres, or can be other materials such as $Al_2O_3$, ZnO, AlN, BN, or diamond. In an exemplary embodiment, particles 108 are nickel spheres having a mean diameter of 13.5 μm with a standard deviation of 3.5 μm, but it is not required for particles 108 to be spherical to practice the invention. Instead, particles 108 preferably can have any shape having a ratio of smallest dimension to largest dimension greater than about 0.2. Similarly, the invention can be practiced with particle sizes other than 13.5 μm (on average).

In an exemplary embodiment, nanofibers 110 are multi-walled carbon nanotubes (CNT) having an outside diameter in a range from about 60 nm to about 100 nm, and a length ranging from about 0.5 μm to about 500 μm. Other suitable materials for nanofibers 110 include single-walled carbon nanotubes, and metallic nano-wires. The invention can be practiced with nanofibers 110 having other shapes and sizes than given above, although preferably nanofibers 110 have a ratio of smallest dimension to largest dimension less than about 0.1 where the smallest dimension is <1 μm.

Figure 2:
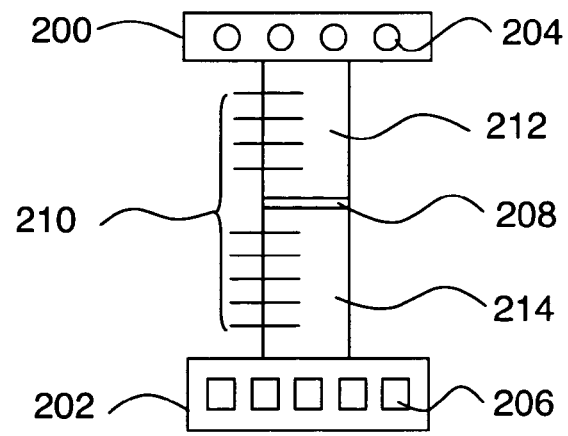
FIG. 2 shows an experimental arrangement for measuring thermal conductivity.

FIG. 2 shows an experimental arrangement suitable for measuring thermal conductivity of a thermal interface material. Heaters 204 are embedded within a heat source 200. Heat source 200 is connected to a heat sink 202 via a first block 212, a thermal interface material 208, and a second block 214. Heat is removed from heat sink 202 by passing a coolant through channels 206 within heat sink 202. The temperature at multiple points within blocks 212 and 214 is measured with temperature probes 210. The heat flow within this experimental arrangement is approximately steady-state, one-dimensional heat flow, which permits simple determination of the thermal conductivity of TIM 208 from measured data.

Figure 3:
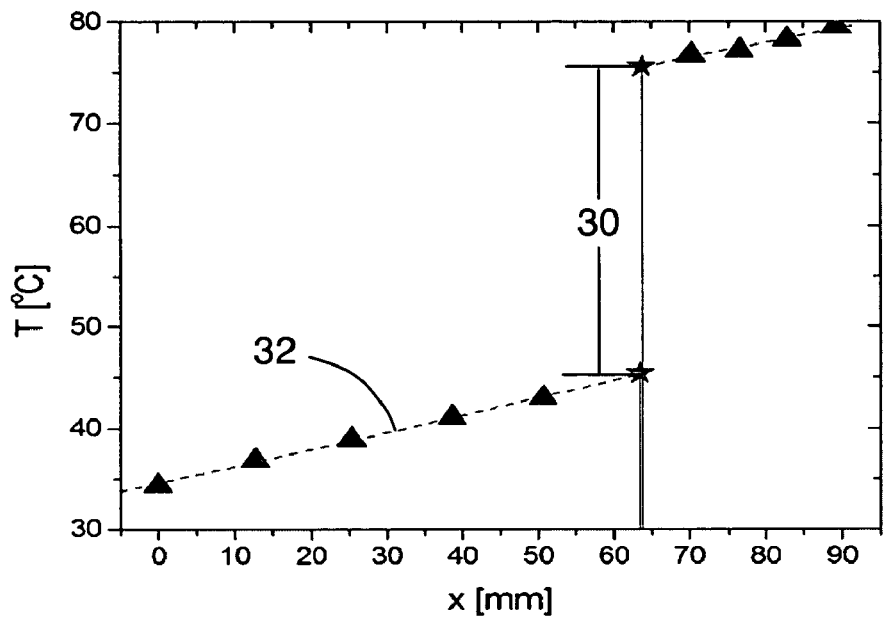
FIG. 3 shows measured results from the arrangement of FIG. 2.

FIG. 3 shows exemplary experimental data from the arrangement of FIG. 2. A temperature drop ΔT(30) is found by linearly extrapolating the temperature vs. position curves in blocks 212 and 214 to the respective interfaces with TIM 208. A temperature slope dT/dx(32) is used to calculate the steady state heat flux q'' from source 200 to sink 202 using the relation q''=kdT/dx. Here k is the thermal conductivity of block 214. Typically blocks 212 and 214 are both made of the same material (e.g., copper). The flux can be calculated using the temperature slope in either block 212 or block 214. The thermal resistance Rth =ΔT/q'' is calculated from measured ΔT and q'' values for several thicknesses L of TIM material 208 (e.g., L=200 μm, 400 μm, and 800 μm). The thermal resistance Rth of a thin layer of thickness L is given by Rth=L/$k_{TIM}$+Rb, where Rb is a boundary thermal resistance, and $k_{TIM}$ is the intrinsic thermal conductivity (hereafter "thermal conductivity") which ideally is independent of specimen geometry and measurement conditions. The thermal conductivity $k_{TIM}$ of TIM material 208 is obtained by linear regression applied to measured Rth(L) data.

Figure 4:
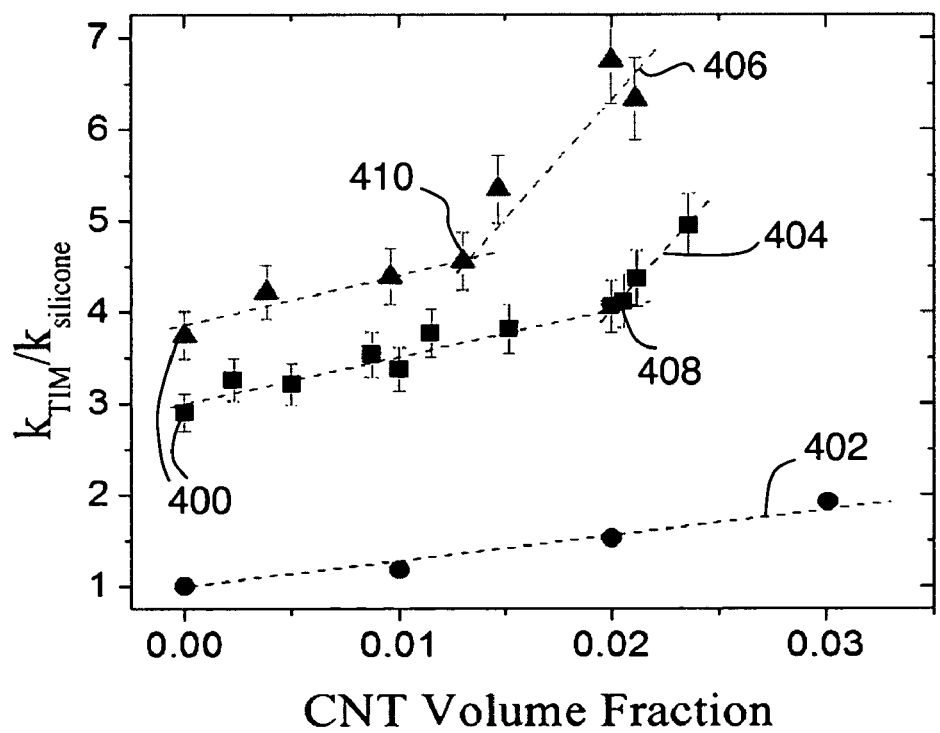
FIG. 4 shows measured thermal conductivity of several compositions according to embodiments of the invention.

FIG. 4 shows $k_{TIM}$ data, measured as indicated in connection with FIGS. 2 and 3, for various TIM compositions. In the example of FIG. 4, matrix material 106 is a silicone oil having a kinetic viscosity of about 9.5 to 10.5 $cm^2$/s at 25° C. The X axis of FIG. 4 is the volume concentration Nf of nanofibers 110, which in this example are multi-walled carbon nanotubes having an outside diameter in a range from about 60 nm to about 100 nm, and a length ranging from about 0.5 μm to about 500 μm. The Y axis of FIG. 4 is a normalized thermal conductivity $k_{TIM}/k_{silicone}$. Three sets of data are shown on FIG. 4. Data set 402 corresponds to TIM compositions having Np=0.0, data set 404 corresponds to TIM compositions having Np=0.3, and data set 406 corresponds to TIM compositions having Np=0.4. For the examples of FIG. 4, particles 108 are nickel spheres having a mean diameter of 13.5 μm with a standard deviation of 3.5 μm.

The data of FIG. 4 shows unexpected and remarkable behavior. More specifically, well defined nanofiber threshold concentrations Nft where the slope changes are present in data sets 404 and 406, and are indicated as 408 and 410 respectively. In this example, Nft is about 0.022 and 0.014 for Np=0.3 and 0.4 respectively. For nanofiber concentrations Nf<Nft, the rate of increase of $k_{TIM}$ as Nf increases is comparable to the slope of data set 402, as expected for non-interacting particles and fibers. In contrast, for Nf>Nft, the rate of increase of $k_{TIM}$ as Nf increases is significantly larger than the slope of data set 402. Thus $k_{TIM}$ has a nonlinear dependence on Nf in compositions where both fibers 110 and particles 108 are present.

The increase in $k_{TIM}$ provided by embodiments of the present invention is remarkably large. For example, data points 400 on FIG. 4 correspond to conventional TIM materials including particles 108 but not including nanofibers 110. The inclusion of less than 3% by volume of nanofibers 110 into such a TIM composition can increase thermal conductivity by more than 100%, assuming the data on FIG. 4 can be extrapolated slightly. To obtain such large values of thermal conductivity using only nanofibers 110 would require a large concentration of nanofibers 110, as can be seen from data set 402 on FIG. 4. Such a large concentration of nanofibers will tend to undesirably render the TIM composition too stiff and non-compliant to make good thermal contact to heat source and heat sink surfaces.

Thus a key discovery of the present invention is that the presence of both particles 108 and nanofibers 110 within a matrix material 106 provides a thermal interface material having unexpectedly high thermal conductivity when the nanofiber concentration Nf is greater than the threshold nanofiber concentration for enhanced thermal conductivity Nft defined above. Furthermore, this high thermal conductivity is obtained with a relatively low nanofiber concentration Nf, which is beneficial because reducing Nf tends to reduce viscosity.

Figure 5:
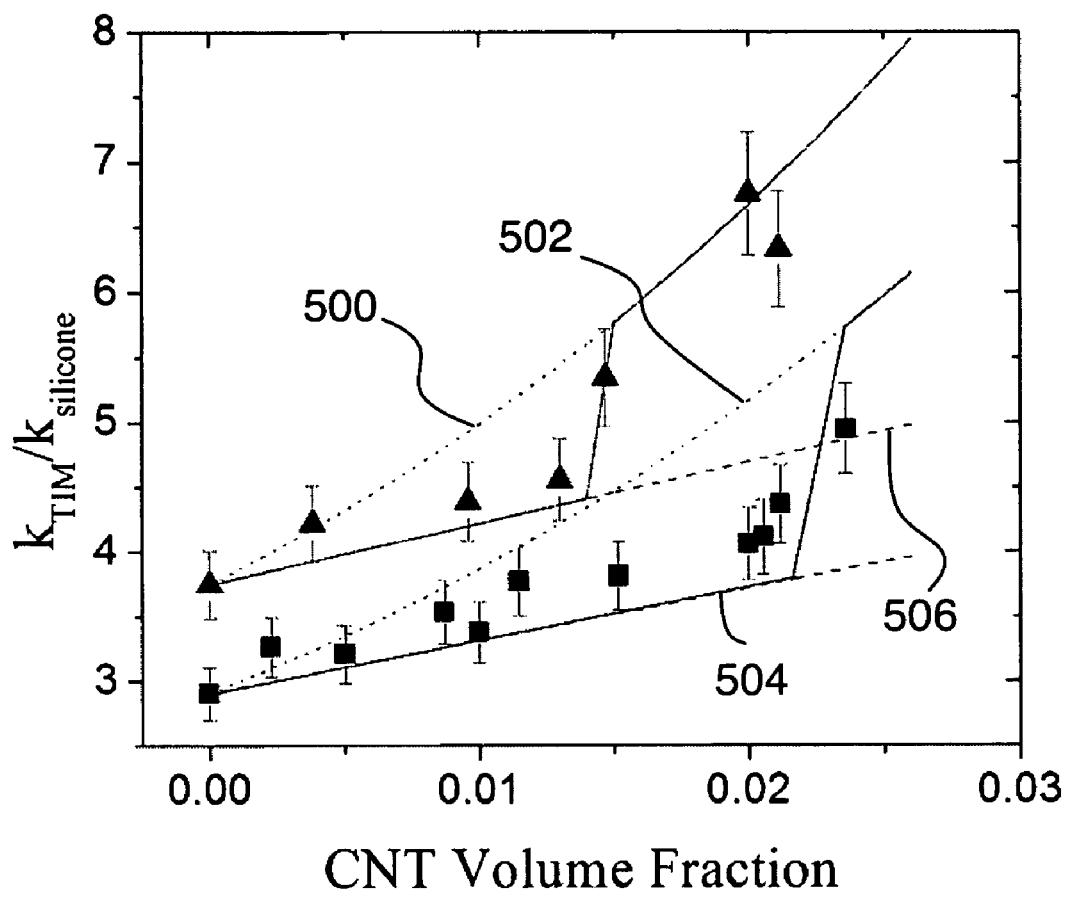
FIG. 5 shows the data of FIG. 4 compared to theoretical models.

FIG. 5 shows data sets 404 and 406 of FIG. 4 plotted along with some curves calculated from simple theoretical models. More specifically, curves 504 and 506 on FIG. 5 are obtained from a zero-correlation model, where particles 108 and fibers 110 are assumed to contribute independently to $k_{TIM}$. Curves 504 and 506 agree well with the measured $k_{TIM}$ data for nanofiber concentrations Nf less than the threshold concentrations Nft. Curves 500 and 502 are obtained from a full-correlation model, where particles 108 and fibers 110 in matrix material 106 together are assumed to act as an effective uniform medium having thermal conductivity $k_{TIM}$. Curves 500 and 502 provide a reasonable upper bound to the experimental data.

The zero-correlation model of FIG. 5 is given by $$k_{TIM}(N_p, N_f) = k_{TIM}(N_p, 0) + \frac{\beta k_m N_f}{1-N_p}, \quad (1)$$

where $k_m$ is the thermal conductivity of matrix material 106, and β is the slope of data set 402 on FIG. 4. Although β has a theoretical value of 2 for inclusions in a 3-D composite medium, measured values of β for media having carbon nanotube inclusions tend to be significantly higher for reasons which are not presently well understood. For example, the data of FIG. 4 gives β=28.55. In Eq. 1, particles 108 and fibers 110 make independent contributions to the thermal conductivity $k_{TIM}$. The full-correlation model of FIG. 5 is given by $$k_{TIM}(N_p, N_f) = k_{TIM}(N_p, 0) \left(\frac{1}{1-N_f}\right)^\beta. \quad (2)$$

Eq. 2 is a solution to the differential equation $dk_{TIM}/dN_f = \beta k_{TIM}/(1-N_f)$.

The presence of well-defined thresholds 408 and 410 on FIG. 4 can be understood in terms of percolation theory. Percolation theory generally predicts sharp transitions in material properties when a threshold for long-range connectivity is crossed. Consider a simple example, where a 2-D lattice has sites connected by bonds. Sites are occupied with probability Ps, and bonds are occupied with probability Pb. The probability Pc that a connected set of occupied sites and bonds extends all the way across the lattice can be calculated in terms of Ps and Pb by renormalization group analysis. For large lattices, Pc typically exhibits sharp thresholds as Ps and/or Pb are varied. For example, in the 2-D lattice example, Pc changes from about 0 to about 1 when Pb increases from 0.684 to 0.685 for Ps=0.77, and Pc changes from about 0 to about 1 when Pb increases from 0.585 to 0.586 for Ps=0.88.

If we regard particles 108 in TIM 100 as occupied sites, and nanofibers 110 in TIM 100 as occupied bonds, we expect the thermal conductivity of TIM 100 to depend significantly on Pc, the probability of large-scale connectivity of sites and bonds. More specifically, if Pc is near unity, the thermal conductivity will be high, since a network of thermally conductive particles 108 and nanofibers 110 will span the entire extent of TIM 100. Conversely, if Pc is near zero, the thermal conductivity will be low, since there will be no path across TIM 100 that only includes particles 108 and nanofibers 110. Of course, the real physical situation is more complicated than the 2-D lattice example discussed above, since TIM 100 is three-dimensional, and particles 108 and nanofibers 110 are not restricted to positions on a lattice. However, the threshold behavior of Pc seen in the 2-D lattice example is very generally found in percolation theory analyses under a wide variety of assumptions. Furthermore, Ps and Pb depend on Np and Nf.

Thus it is reasonable to interpret the thresholds observed on FIG. 4 as resulting from a long-range connectivity threshold as considered in percolation theory. In this interpretation, for Nf<Nft, the probability of long range connectivity is nearly zero, while for Nf>Nft, the probability of long range connectivity is nearly unity. Furthermore, it is reasonable to assume the heat conductivity of this connected part of TIM 100 is proportional to Nf−Nft, resulting in the higher slopes of data sets 404 and 406 for Nf greater than thresholds 408 and 410 respectively. Finally, the decrease of Nft as Np increases seen in the data of FIG. 4 is also consistent with the percolation theory interpretation. As Ps increases, the required Pb to reach the Pc=1 threshold decreases, as seen in the 2-D lattice example above.

Figure 6:
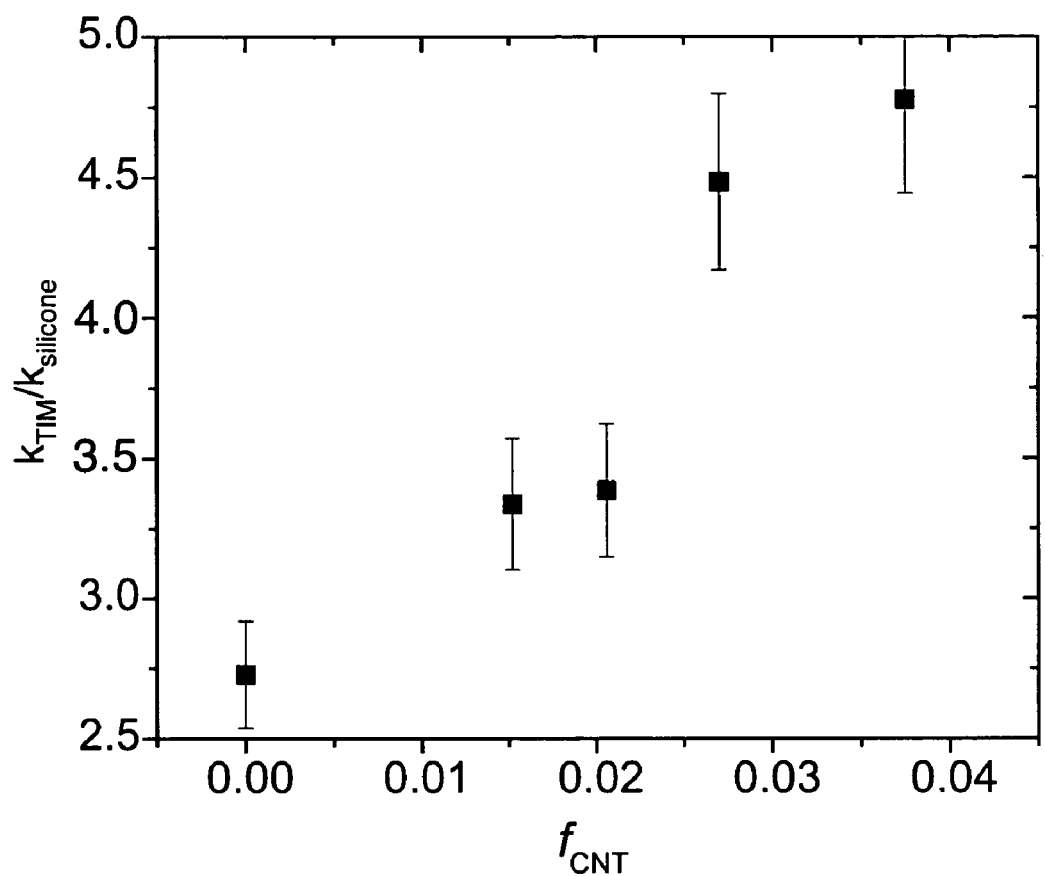
FIG. 6 shows measured thermal conductivity of several compositions according to further embodiments of the invention.

FIG. 6 shows results from a second exemplary embodiment of the invention. In this example, carbon nanotubes (having dimensions as in the the previous examples) are added to a mixture of silicone oil and ZnO particles. This mixture is commercially available as Dow Corning compound 340. On FIG. 6, $f_{CNT}$ is the carbon nanotube volume fraction (i.e., $f_{CNT}$ is equivalent to Nf). The vertical axis on FIG. 6 shows thermal conductivity relative to the thermal conductivity of silicone oil. Thus the data point for $f_{CNT}=0$ shows the thermal conductivity of Dow Corning compound 340 as being about 2.75 times that of silicone oil. The thermal conductivity increases as Nf increases. The results of FIG. 6 also show a sharp threshold in thermal conductivity at a threshold fiber concentration Nft of about 2.5%. In practice, the increase in thermal conductivity as Nf increases typically is balanced against the undesirable increase in viscosity as Nf increases to select Nf for optimal thermal and mechanical TIM performance.

What is claimed is:

1. A thermal interface material comprising:
   a) a mechanically compliant matrix material;
   b) a plurality of particles having a volume concentration Np within the matrix material; and
   c) a plurality of nanofibers having a volume concentration Nf within the matrix material;
   wherein Nf is greater than a threshold nanofiber volume concentration Nft for enhanced thermal conductivity.

2. The thermal interface material of claim 1, wherein said matrix material comprises silicone oil, an epoxy, an elastomer, a phase change material, or any combination thereof.

3. The thermal interface material of claim 1, wherein said matrix material has a dynamic viscosity between about 1,000 cgs and about 100,000 cgs.

4. The thermal interface material of claim 1, wherein said particles comprise particles of an elemental metal, a metal alloy, $Al_2O_3$, ZnO, AlN, BN, diamond, or mixtures thereof.

5. The thermal interface material of claim 1, wherein said particles can be spherical or non-spherical, wherein if said particles are non-spherical then a ratio of a smallest length across one of said particles to a largest length across the same of said particles is greater than about 0.2.

6. The thermal interface material of claim 1, wherein said particles are more thermally conductive than said matrix material.

7. The thermal interface material of claim 1, wherein said nanofibers comprise carbon nanotubes.

8. The thermal interface material of claim 1, wherein each of said nanofibers has a length and a diameter, wherein a ratio of said diameter to said length is less than about 0.1.

9. The thermal interface material of claim 1, wherein each of said nanofibers has a length and a diameter, wherein said length and said diameter are less than about 1 μm.

10. The thermal interface material of claim 1, wherein Nf is less than about 5%.

11. The thermal interface material of claim 1, wherein said nanofibers are more thermally conductive than said matrix material.

12. A method for facilitating heat flow from a heat source to a heat sink, the method comprising:

a) providing a mechanically compliant matrix material in contact with and between the heat source and the heat sink;
b) providing within the matrix material a plurality of particles having a volume concentration $N_p$;
c) providing within the matrix material a plurality of nanofibers having a volume concentration $N_f$ wherein $N_f$ is greater than a threshold nanofiber volume concentration $N_{ft}$ for enhanced thermal conductivity.

13. The method of claim 12, wherein said matrix material comprises silicone oil, an epoxy, an elastomer, a phase change material, or any combination thereof.

14. The method of claim 12, wherein said matrix material has a dynamic viscosity between about 1,000 cgs and about 100,000 cgs.

15. The method of claim 12, wherein said particles comprise particles of an elemental metal, a metal alloy, $Al_2O_3$, ZnO, AlN, BN, diamond, or mixtures thereof.

16. The method of claim 12, wherein said nanofibers comprise carbon nanotubes.

17. The method of claim 12, wherein $N_f$ is less than about 5%.

* * * * *